(12) United States Patent
Meyer et al.

(10) Patent No.: US 6,170,055 B1
(45) Date of Patent: Jan. 2, 2001

(54) SYSTEM FOR COMPUTER RECOVERY USING REMOVABLE HIGH CAPACITY MEDIA

(75) Inventors: George Raymond Meyer; Trent Mark Thomas, both of Ogden; Troy Taylor Davidson, Clinton; Stephen Larry McBride, North Ogden; Stefan A. Teleki, Layton, all of UT (US)

(73) Assignee: Iomega Corporation, Roy, UT (US)

(*) Notice: Under 35 U.S.C. 154(b), the term of this patent shall be extended for 0 days.

(21) Appl. No.: 08/962,637

(22) Filed: Nov. 3, 1997

(51) Int. Cl.$^7$ .................................................. G06F 11/14
(52) U.S. Cl. ................................................................ 713/2
(58) Field of Search .................................. 713/2, 1, 100; 380/4, 25; 707/1, 200

(56) References Cited

U.S. PATENT DOCUMENTS

| | | | |
|---|---|---|---|
| 4,102,493 | * 7/1978 | Moreno | 235/419 |
| 5,136,711 | 8/1992 | Hugard et al. | 395/700 |
| 5,325,532 | 6/1994 | Crosswy et al. | 395/700 |
| 5,469,573 | * 11/1995 | McGill, III et al. | 395/700 |
| 5,627,964 | 5/1997 | Reynolds et al. | 395/183.22 |
| 5,659,614 | * 8/1997 | Bailey, III | 380/4 |
| 5,671,355 | * 9/1997 | Collins | 395/200.2 |
| 5,805,898 | * 9/1998 | Barsness et al. | 395/712 |
| 5,819,020 | * 10/1998 | Beeler, Jr. | 395/182.03 |
| 5,819,056 | * 10/1998 | Favor | 395/380 |
| 5,826,073 | * 10/1998 | Ben-Meir et al. | 395/567 |
| 5,842,024 | * 11/1998 | Choye et al. | 395/712 |

FOREIGN PATENT DOCUMENTS

WO 95/22794    8/1995 (WO).
WO 97/29451    8/1997 (WO).

OTHER PUBLICATIONS

U.S. application No. 08/599,346, Khenson et al., filed Feb. 9, 1996.
U.S. application No. 08/651,321, Thomas et al., filed May 21, 1996.
Starrett, R., "Writing Bootable CD-ROM", *CD ROM Professional*, 1995, 8(8), 98–104.

* cited by examiner

Primary Examiner—Joseph E. Palys
Assistant Examiner—Omar A. Omar
(74) Attorney, Agent, or Firm—Woodcock Washburn Kurtz Mackiewicz & Norris LLP

(57) ABSTRACT

A computer recovery system provided on a removable high capacity disk. In the event that a user encounters an abnormal operating condition, the user inserts the removable high capacity disk into the computer and restarts the computer. The computer boots either directly from the removable high capacity disk or from a floppy disk which transfers control to the removable high capacity disk. The removable high capacity disk includes all of the files necessary to load the computer operating system and launch the graphical user interface of the operating system such that the user is provided with a familiar operating environment. The removable high capacity disk also includes a suite of software recovery software which attempt to ascertain and correct the cause of the abnormal operating condition to return the computer system to a normal operating condition. In the event the recovery system cannot correct the cause of the abnormal operating condition, the user may continue working with files located on the hard disk within the computer or perform a restore operation from an archive.

26 Claims, 9 Drawing Sheets

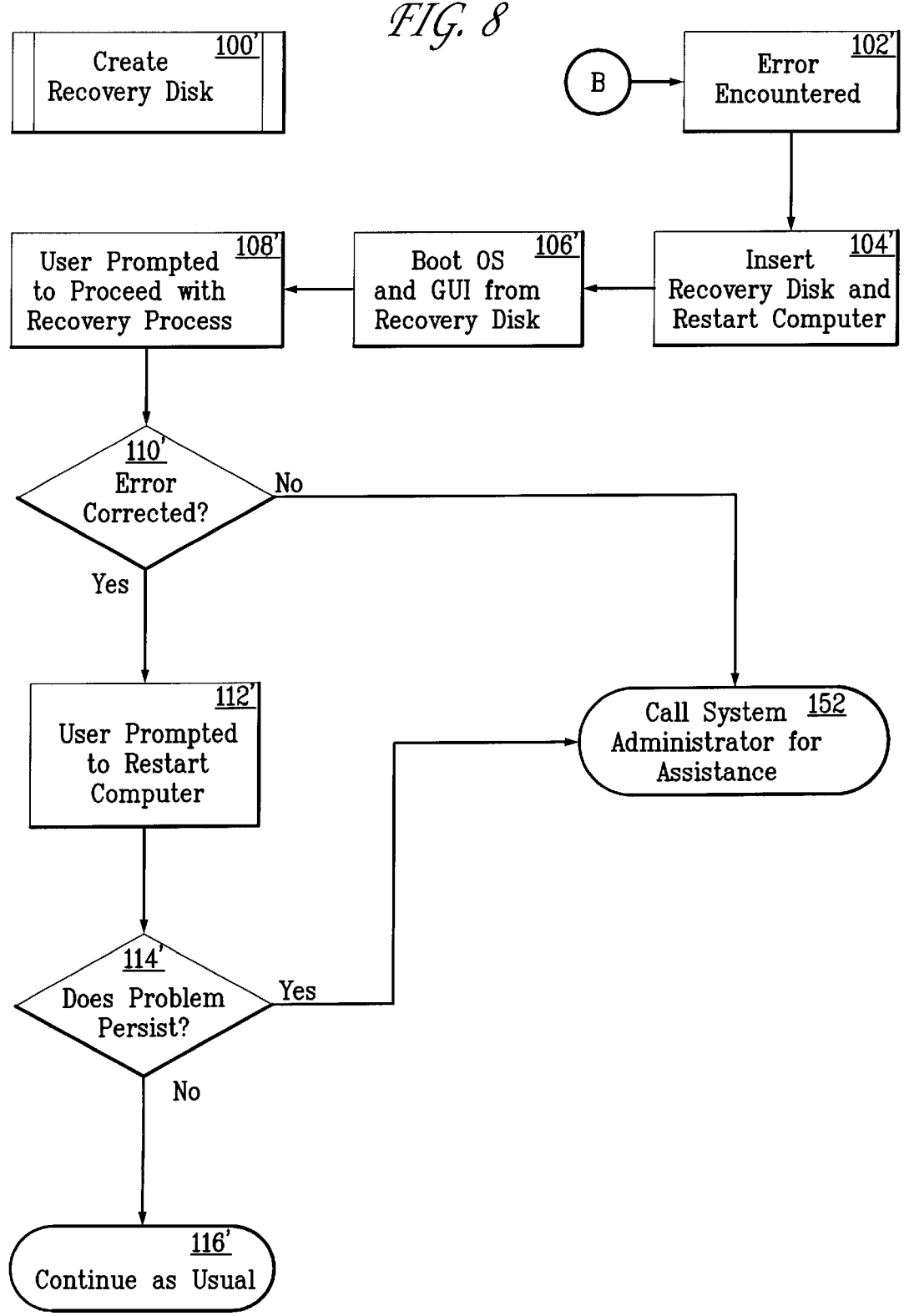

SYSTEM FOR COMPUTER RECOVERY USING REMOVABLE HIGH CAPACITY MEDIA

FIELD OF THE INVENTION

The present invention relates to a computer disaster recovery and repair system. In particular, the present invention relates to a computer disaster recovery system, contained on a removable high capacity media, which includes a subset of operating system components and which detects and repairs system defects.

BACKGROUND OF THE INVENTION

For as long as computers have existed, system administrators and users have been concerned about disasters and disaster recovery when components within a computer system eventually fail. Such disasters and failures are frustrating because they may cause data loss, computer lock-up and crashes, or total failure of the computer to boot upon restarting.

Historically, there have been two approaches to disaster recovery. The first is a backup solution whereby data from the hard drive is periodically copied to removable media (e.g., tape or removable disks) in effort to minimize the impact of such failures. Such backup solutions are relatively straightforward, but require that the user or system administrator implement a plan to routinely backup selected or all files from the hard drive to the removable media. In the event that files become corrupted or are deleted or lost, an archive version of the files can be restored from the removable media to the computer's long-term storage device (e.g., hard disk). If the disaster is of such a magnitude that the computer is unusable, the files may be restored to another computer.

A key disadvantage of this first method is that it requires the user to perform regular backups. Accordingly, the user's data is protected only up to date and time the last backup was performed. Therefore, it is possible that users may lose days, weeks, or possible all of their data. This is especially the case with home users who rarely, if ever, perform regular backups of data.

The second approach is a repair solution whereby recovery software attempts to remedy the cause of a failure without the need for a user to perform a restore operation. Such recovery software may reside on the computer's hard disk, in memory as a terminate and stay resident (TSR) application, or may be stored on a bootable floppy disk (recovery/rescue disk). The recovery software attempts to correct invalid CMOS settings, corrupted drive partition tables, system file integrety, boot sectors, etc. Some recovery softare performs routine preventative maintenance functions such as disk defragmentation, copying selected critical files and settings to a safe location (e.g., a floppy disk or other portion of the hard drive), and system diagnostics. In the event of a failure or error, the user runs the recovery software from the hard disk or the floppy recovery disk to boot the system and to attempt to correct the cause of the failure.

A problem with conventional recovery utilities is that when a computer fails to boot from the hard disk, the bootable recovery disk only provides a user with a command line environment. For example, the disaster recovery software may boot the computer to a prompt (e.g., a DOS prompt such as A:\>). Therefore, the user is not provided with a user-friendly and familiar graphical user interface (GUI). This is a particular problem because of the popularity of operating systems that utilize graphical user interfaces (e.g., Windows 9X, Windows NT, and the Macintosh OS). Further compounding the problem is the number of newer computer users who are unaccustomed with the command line syntax of the operating system commands.

Conventional disaster recovery utilities may add to the confusion by requiring the user to remember yet additional commands to execute the various recovery features. It is also likely that recovery software may includes only limited documentation and on-line help. These problems increase the level of frustration experienced by users who are worried about losing sensitive data, and lead to a large number of telephone calls, facsimiles and E-mails to technical support personnel. This is especially so given the ever increasing number of first time purchasers of computer systems. As the number of users of personal computers continues to grow, technical support departments will stretched further to their limits to accommodate support calls.

A reason for the problems and limitations of known disaster recovery software is the relatively low capacity of the bootable floppy disk. Conventional computer systems include at least one 3½" floppy disk drive having a capacity of 1.44 MB. The 3½" floppy disk only provides enough storage capacity to boot a computer to a limited environment and does not have the storage capacity to allow the computer to boot to the more user friendly graphical user interface. Another reason for the limitations of known disaster recovery utilities is that when operating systems such as Windows are installed, they are configured to include specific drivers and libraries based on the computer's hardware setup (e.g., video card, modem, hard disk controller, sound board, etc.). Therefore, it is difficult for manufacturers of recovery software utilities to provide a recovery disk that will include a compatible set of drivers for every possible configuration of computer hardware available on the market. While attempts have been made to launch the operating system with a generic set of drivers having the most basic of functionalities (e.g., Windows 9X "safe mode"), such attempts are lacking because they do not provide for disaster recovery, require that the computer be booted from the hard disk, and do not provide access to all of the peripherals attached to the computer as not all drivers are loaded when the operating system is launched. Further, such attempts are generally limited to resolving incompatibility problems within the operating system itself (e.g., incompatible drivers).

In view of the above, there is a need for a disaster recovery system having enhanced capabilities which is capable of booting a computer to an operating environment that is familiar to the user. In particular, there is a need for the capability to launch the operating system and graphical user interface from removable media so that users are not dependent on booting from the hard disk drive. Further, there is a need for a disaster recovery system which may be quickly and easily tailored to a specific machine and capable of detecting and repairing errors with little or no user interaction. Yet further, there is a need for a disaster recovery system which will enable a user to gain access to computer system and transfer files from an abnormally operating computer system to another computer system. Such an enhanced disaster recovery system will reduce calls to technical support personnel, allow users to fix problems without the need for help, reduce recovery time from critical system failures, increase productivity and system usability, and place users at ease.

SUMMARY OF THE INVENTION

In view of the above, the present invention, through one or more of its various aspects and/or embodiments is thus presented to accomplish one or more objects and advantages, such as those noted below.

According to aspect of the present invention, a method for correcting an abnormal operating condition of the computer system using recovery software stored on removable high capacity media is provided in a computer system having a processor, a high capacity removable media drive, non-removable storage media and an operating system that includes an operating environment which provides a user with a graphical user interface. Under normal operating conditions, the operating system and the graphical user interface are loaded from the non-removable storage media. In addition, the removable high capacity media includes a subset of a total number of components of the operating system. The method includes inserting the removable high capacity media into the high capacity removable media drive upon encountering the abnormal operating condition; restarting the computer system from the removable high capacity media such that the operating system and the graphical user interface are loaded from the removable high capacity media; and launching the recovery software to rectify the abnormal operating condition upon successfully loading the graphical user interface. The computer is restarted from the non-removable storage media after rectifying the abnormal operating condition.

If the a high capacity removable media drive is bootable, then restarting the computer system comprises executing bootstrap files located on the removable high capacity media. However, if the removable media drive is not bootable, then restarting the computer system comprises executing bootstrap files located on a bootable floppy disk; loading software drivers to gain access to the high capacity removable media drive; changing a current drive letter or a current volume label of the high capacity removable media drive to a modified drive letter or a modified volume label, as necessary; and executing an operating system instruction to continue loading of the operating system and the graphical user interface from the removable high capacity media.

Changing the drive letter or the volume label comprises identifying a bus, adapter and drive ID number of the high capacity removable media drive; identifying the current drive letter and the current volume label of the high capacity removable media drive; and adjusting operating system data, initialization files and registry information to indicate the high capacity removable media drive by the modified drive letter or the modified volume label. In addition, if the modified drive letter identifies another drive in the computer system, the operating system data, the initialization files and the registry information are adjusted to change the another drive to a drive letter not used by the operating system.

According to a feature of the present invention, the method also includes determining if the abnormal operating condition persists in the computer system; restoring files to the non-removable media from an archive if the abnormal operating condition persists; and reinstalling the operating system to the non-removable media if no archive exists.

According to another feature, the removable high capacity media may be partitioned. The method of correcting an abnormal operating condition further comprises presenting the partitioned removable high capacity media to the operating system as non-partitioned media by performing the following: determining if the partitioned removable high capacity media is valid, and if the partitioned removable high capacity media is not valid, not presenting the removable high capacity media to the operating system, and if the removable high capacity media is valid then calculating an offset from a beginning of the removable high capacity media to a beginning of a desired partition on the removable high capacity media to be accessed; for each request by the operating system to read or write to a location in a volume of the removable high capacity media, modifying the request by adding the offset to the request to create a modified request; and determining a type of request by the operating system.

The process of determining a type of request comprises determining if the request is to read data at a beginning of the volume, and if so, performing a read operation and modifying the data to reflect a format of the non-partitioned media as it passed to the operating system; determining if the request is to write data to the beginning of the volume, and if so, modifying the request to reflect a format of the partitioned media and performing a write operation; determining if the request is for user data, and if so, performing a read or write operation using the modified request; and determining if the request is for a media size, and if so, returning to the operating system a size of the partitioned removable high capacity media.

According to another aspect of the present invention, a method of creating a recovery disk on removable high capacity media is provided for a computer system comprising a processor, a high capacity removable media drive, non-removable storage media and an operating system which includes an operating environment that provides a user with a graphical user interface. The operating system and the graphical user interface are loaded from the non-removable storage media under normal operating conditions. The method includes generating a list of software components needed to completely load the operating system and the graphical user interface from the removable high capacity media; copying the software components to the removable high capacity media; and copying the recovery software to the removable high capacity media. An operating system command may be installed to run from the removable high capacity media to execute the recovery software.

According to a feature of the present invention, generating a list of components comprises scanning a list of files on the non-removable media; examining configuration, initialization and registry files; and searching the non-removable media to determine executable program files, libraries and program file dependencies. The method may also include adjusting configuration, initialization and registry files on the removable high capacity media to reflect a drive letter or volume label of the high capacity removable media drive from which the operating system will be running when the computer is restarted from the removable high capacity media. Further, the method may include determining from the computer system if the high capacity removable media drive is bootable; and copying operating system bootstrap files to the removable high capacity media if the high capacity removable media drive is bootable.

Where the high capacity removable media drive is not bootable, the method may include creating a bootable floppy disk by copying operating system bootstrap files to the bootable floppy disk if the high capacity removable media drive is not bootable; determining a bus type and adapter of the high capacity removable media drive; determining software drivers needed to access the high capacity removable media drive; copying the software drivers to the bootable floppy disk; and installing instructions to continue a bootstrap process from the high capacity removable media drive once the bootstrap process is initiated from the floppy disk.

According to yet another aspect of the present invention, there is a provided an apparatus for recovering from an abnormal operating condition in a computer system, comprising a processor; a high capacity removable media drive; a process for loading an operating system from the high capacity removable media drive, the operating system providing an operating environment that includes a graphical user interface; and software for rectifying the abnormal operating condition to return the computer system to a normal operating condition.

According to a feature of the present invention, the apparatus may also include processes and devices to determine if the abnormal operating condition persists in the computer system; to restore files to the non-removable media from an archive; and to reinstall the operating system to the non-removable media.

According to another feature, the high capacity removable media drive is bootable, and the a bootstrap process is performed by executing bootstrap files located on the removable high capacity media. Where the high capacity removable media drive is not bootable, control of a bootstrap process is transferred from the floppy drive to the high capacity removable media drive; and a current drive letter or a current volume label of the high capacity removable media drive is changed to a modified drive letter or a modified volume label, as necessary. The bootstrap files are initially executed from a bootable floppy disk, and then the execution of the bootstrap files is continued and the operating system and the graphical user interface loaded from the removable high capacity media.

The process to change a drive letter or volume label identifies a bus, adapter and drive ID number for the high capacity removable media drive, identifies the current drive letter and the current volume label of the high capacity removable media drive, and adjusts operating system data, initialization files and registry information to indicate the high capacity removable media drive by the modified drive letter or the modified volume label. If the modified drive letter is assigned to another drive by the operating system, the drive letter changing process further adjusts the operating system data, the initialization files and the registry information to change the another drive to a drive letter not in use by the operating system.

According to yet another feature of the present invention, the removable high capacity media may be partitioned, and the apparatus comprises a process for presenting the partitioned removable high capacity media to the operating system as non-partitioned media. The presentation process determines if the partitioned removable high capacity media is valid, and if the partitioned removable high capacity media is not valid, does not present the removable high capacity media to the operating system. If the partitioned media is valid, the presentation process calculates an offset from a beginning of the removable high capacity media to a beginning of a desired partition on the removable high capacity media to be accessed; modifies a request by the operating system to read or write to a location in a volume of the removable high capacity media by adding the offset to the request; and determines a type of request by the operating system.

According to yet another aspect of the present invention, there is provided an apparatus for creating a recovery disk for a computer system having an operating system which provides an operating environment including a graphical user interface. The recovery disk includes recovery software on a removable high capacity media. The apparatus comprises a processor; a high capacity removable media drive; a process for generating a list of components needed to completely load the operating system and the graphical user interface from the removable high capacity media; and a process for copying the components and the recovery software to the removable high capacity media.

According to a feature of the present invention, generating process includes a process for scanning a list of files on the non-removable media; a process for examining configuration, initialization and registry files; and a process for searching the non-removable media to determine executable program files, libraries and program file dependencies. The apparatus may also include a process for adjusting configuration, initialization and registry files on the removable high capacity media to reflect a drive letter or volume label of the high capacity removable media drive from which the operating system will be running when the computer is restarted.

According to another feature of the present invention, if the high capacity removable media drive is bootable, the process for copying copies operating system bootstrap files to the removable high capacity media. If the high capacity removable media drive is not bootable, then the apparatus may be provided with a process for determining a bus type and adapter of the high capacity removable media drive; and a process for determining software drivers needed to access the high capacity removable media drive. The copying process copies operating system bootstrap files, the operating system components, and instructions to continue a bootstrap process from the high capacity removable media drive. The instructions to continue the bootstrap process are executed once the bootstrap process is initiated from a bootable floppy disk inserted into the low capacity floppy drive.

According to still another aspect of the present invention, an apparatus for bootstrapping a computer system from removable high capacity media is provided for a computer system running an operating system that includes an operating environment which provides a user with a graphical user interface. The apparatus comprises a processor; a high capacity removable media drive operatively connected to the processor; and a process and device for loading the operating system and the graphical user interface from the removable high capacity media. The removable high capacity media includes all necessary operating system components to completely load the operating system and the graphical user interface and provide a user with access to all computer peripherals.

According to a further aspect of the present invention, a removable storage cartridge is provided that includes high capacity storage media for use in a computer system having a processor, non-removable media, a high capacity removable media drive and an operating system which includes an operating environment that provides a user with a graphical user interface. The high capacity storage media is configured by a method comprising generating a list of software components needed to completely load the operating system and the graphical user interface from the high capacity storage media, and copying the software components to the high capacity storage media.

According to a feature of the present invention, the list of components copied to the high capacity storage media is generated by scanning a list of files on the non-removable media; examining configuration, initialization and registry files; and searching the non-removable media to determine executable program files, libraries and program file dependencies. Further, the method may include adjusting configuration, initialization and registry files on the high capacity storage media to reflect a drive letter or volume label of the high capacity removable media drive from which the operating system will be running when the computer is restarted from the high capacity storage media.

According to another feature, the method of configuring the high capacity storage media comprises determining from the computer system if the high capacity removable media drive is bootable; and copying operating system bootstrap files to the high capacity storage media if the high capacity removable media drive is bootable. If the high capacity removable media drive is not bootable, then the method includes creating a bootable floppy disk by copying operating system bootstrap files to the bootable floppy disk if the high capacity removable media drive is not bootable; determining a bus type and adapter of the high capacity removable media drive; determining software drivers needed to access the high capacity removable media drive; copying the software drivers to the bootable floppy disk; and installing instructions to continue a bootstrap process from the high capacity removable media drive once the bootstrap process is initiated from the floppy disk.

According to a further feature of the present invention, the method of configuring the high capacity storage media comprises copying recovery software to the high capacity storage media, and installing an operating system command run from the high capacity storage media to execute the recovery software.

According to yet another aspect of the present invention, application software is provided for use on a computer system having a high capacity removable media drive and an operating system which provides an operating environment including a graphical user interface. The application software comprises system components needed to completely load the operating system and the graphical user interface from the high capacity removable media drive, and recovery components which are run from the graphical user interface. The application software is provided on removable high capacity media which is read by the high capacity removable media drive.

According to a feature of the invention, the application software further comprises operating system bootstrap files. If the high capacity removable media drive is not bootable, the operating system bootstrap files are provided on a floppy disk and the application software further comprises an instruction to continue a bootstrap process from the high capacity removable media drive. The instruction to continue the bootstrap process is executed once the bootstrap process is initiated from the floppy disk.

According to another feature of the present invention, the application software includes a command, installed on the removable high capacity media, to execute the recovery components.

Other features of the invention are described below.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, in which like references numerals represent similar parts throughout the several views of the drawings, it being understood, however, that the invention is not limited to the specific methods and instrumentalities disclosed. In the drawings:

FIG. 8 is a flow chart illustrating an overview of the process of recovering from an error in accordance with another embodiment of the present invention.

DETAILED DESCRIPTION OF THE PREFERRED EMBODIMENTS

The present invention provides a method and apparatus for disaster recovery of a computer system using a removable high capacity media device. Typically, the disasters are the result of operating system instability due to corruption of critical files caused by physical and logical errors in the long-term (e.g., a hard disk) or temporary (e.g., random access memory) storage media. The physical and logical errors may be caused by a variety of different sources such as power surges, software and hardware incompatibilities, and degradation of the storage media. In addition, disasters may be caused by computer viruses, which intentionally delete or corrupt critical files. The present invention is directed to resolving disasters and errors, particularly in an environment where the operating system includes a graphical user interface and runs in a 32-bit (or more) flat memory model, i.e., the address space is defined with one 32-bit (or more) register without segments or indexing.

As will be described herein, the recovery disk contains a set of operating system components, determines registry differences, and creates a new registry (if necessary). The recovery software operates without requiring the user to enter commands at a command line interface. In addition, the user is not rendered incapacitated with the recovery solution of the present invention. Experienced users may bypass the automatic recovery features and access E-mail/ fax (local modem), LAN/WAN applications and files, printers (local and networked), run operating system and third party recovery software, access safe mode (Windows 9X) state for testing. If the error is catastrophic (i.e., non-recoverable) in nature, the user will still be able to run the operating system from a high capacity removable media drive until the user has an opportunity to correct the problem.

Another advantage of the recovery disk of the present invention is that original equipment manufacturers (OEM) may be able to create a single recovery disk that supports all standard leading configurations. Such a disk may be created by including all of the necessary files for the leading configurations on the high capacity removable disk. Therefore, OEMs may easily provide support for all of their leading configurations by shipping purchasers a copy of the recovery disk.

Figure 1:
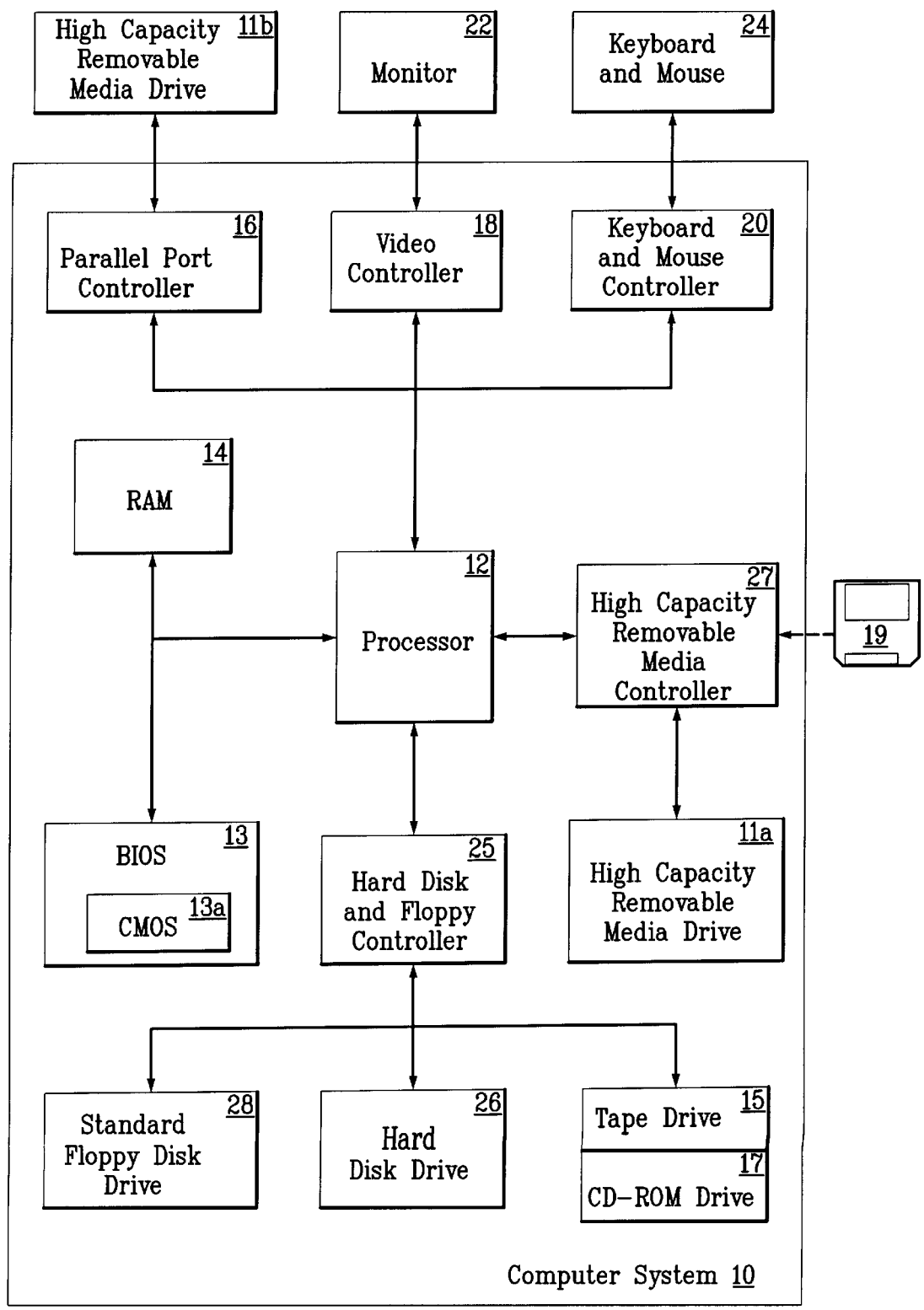
FIG. 1 is a block diagram of a computer system which includes a high capacity removable disk drive.

Referring now to FIG. 1, there is illustrated a block diagram of an exemplary computer system 10. As shown, the computer system 10 is divided between internal and external components. The internal components include a Basic Input/Output System (BIOS) 13 and a processor (CPU) 12 that control the overall functioning of the computer system 10. A memory 14, a hard disk drive 26, a floppy disk drive 28, a tape drive 15, a CD-ROM drive 17, and a high capacity removable media drive 11a are also connected to the CPU 12.

Typically, a conventional IBM-compatible computer system 10 employs the Windows 95 or Windows NT operating systems (available from Microsoft Corp., Redmond, Wash.) and includes a BIOS 13 that supports a configuration wherein floppy drives having a capacity of 720k to 1.44 MB are assigned drive letters a: and b:. The BIOS 13 also provides for fixed disks which are assigned drive letters c:, d: and so on, and are configured with a cylinder, head and sector number that relates to the capacity of the drive. Further, as most BIOSes 13 in computer systems support booting (i.e., starting the system) from only drives a: and c:, it is preferable that the BIOS 13 supports a configuration wherein the high capacity removable media drive 11a or 11b may be assigned drive letter a: such that the computer system 10 may be booted from the high capacity removable media drive. The high capacity removable media drive 11a or 11b operates to read and/or write to a high capacity storage media contained within a removable storage cartridge 19.

A removable high capacity media controller 27 serves as an interface between the removable media drive 11a and the CPU 12. For example, the high capacity removable disk controller 27 may comprise a Small Computer System Interface (SCSI) or Integrated Drive Electronics (IDE) interface controller. A hard disk and floppy disk controller 25 serves as an interface between the CPU 12 and the hard disk 26 and the CD-ROM drive 17, and the floppy disk 28 and tape drive 15, respectively. It will be appreciated by those skilled in the art, the disk controller 25 may comprise separate floppy and hard disk controllers (e.g., IDE or SCSI controller), and that the high capacity removable media drive 11a may also utilize the disk controller 25 as an interface to the CPU 12.

An exemplary high capacity removable media drive is disclosed in U.S. patent application Ser. No. 08/651,321, filed on May 21, 1996, the disclosure of which is incorporated herein by reference in its entirety. In the exemplary embodiment in application Ser. No. 08/651,321, an IDE high capacity removable media drive 11a is described which may comprise several subcomponents, including: a 40 pin IDE bus connection; a CPU, for example, an 8052; a 1k Data RAM memory for executing local programs; a 32k ROM memory for storage of programs; a controller circuit, such as an AIC-7166 manufactured by Adaptec, which controls buffer management of data to and from the media, media interface, and processor interface via the IDE bus; a Timing Processor for providing timing signals to the servo motors and the read/write channel; motor control circuitry; an RLL encoder for writing data to the media; and an RLL decoder for reading data from the media. The high capacity removable media drive 11a or 11b is capable of communicating with the removable high capacity media (IDE) controller card 27 via cylinder, head, and sector mode (hereinafter CHS mode) or logical block address mode (hereinafter LBA mode). In CHS mode, the controller card 27 presents a logical cylinder, head and sector from which data on the media is desired. The drive translates this information to a physical cylinder, head and sector to retrieve the data from the media. Importantly, the cylinder head and sector information set into CMOS 13a defines the logical number of cylinders, heads and sectors on the drive and defines the translation used by the drive to determine where to physically retrieve the data on the media. In LBA mode, the controller card 27 communicates with the drive 11a through a linear mapping of sectors, starting at sector 0 and continuing to the last sector depending on the capacity of the drive.

Other controllers are connected to the CPU 12 to provide an interface between a variety of external devices and the CPU 12. For example, a parallel port controller 16, a monitor controller (video card) 18, and a keyboard and mouse controller 20 each provide an interface between CPU 12 and an external high capacity removable media drive 11b (or printer), monitor 22, and keyboard and mouse device 24, respectively. The exemplary computer system 10 of FIG. 1 is configured with two high capacity removable media drives to emphasize that a high capacity removable media drive can be implemented in either internal or external form.

Figure 2:
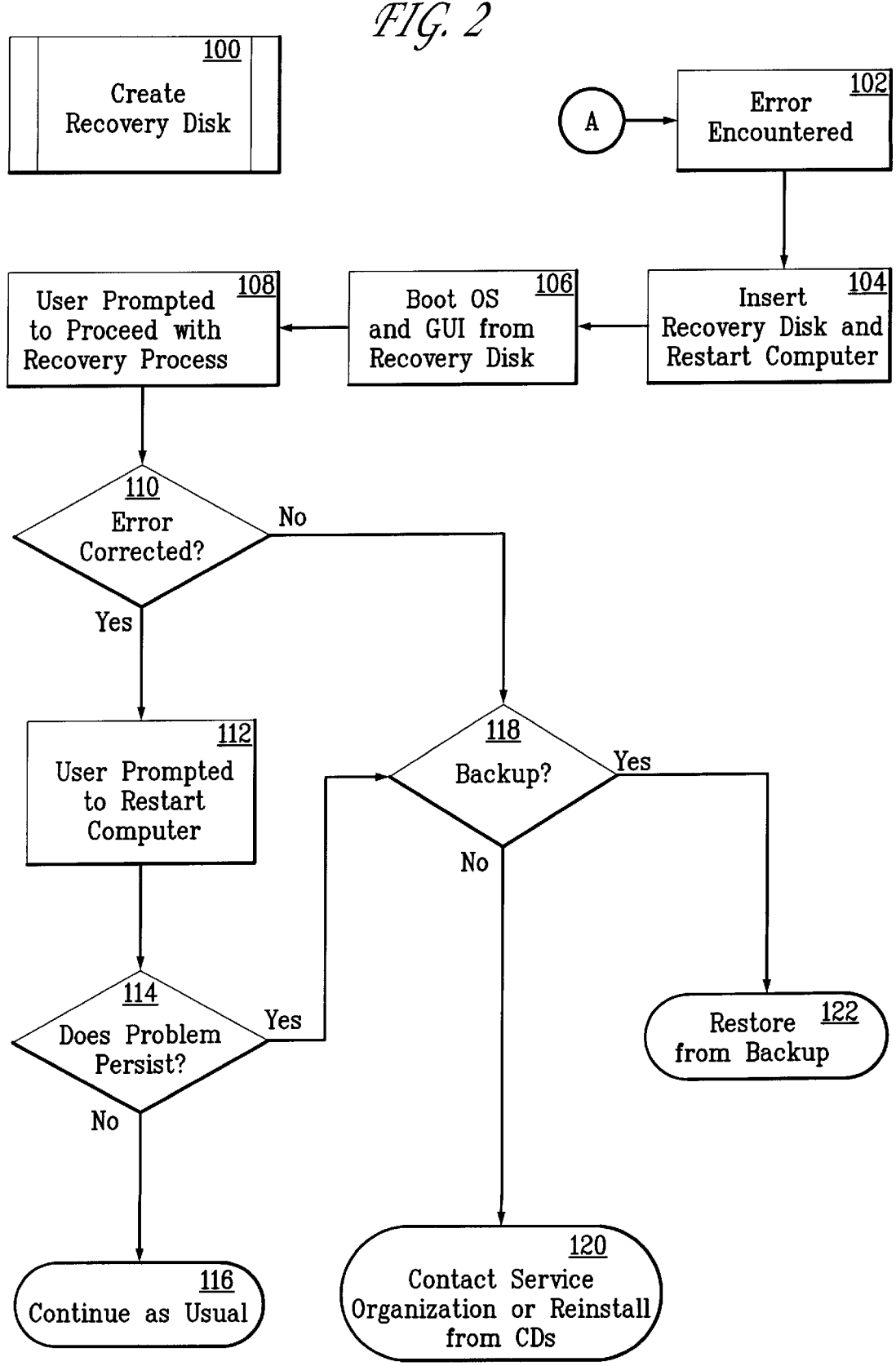
FIG. 2 is a flow chart illustrating an overview of the process of recovering from an error in accordance with an embodiment of the present invention.

Referring now to FIG. 2, there is shown a flow chart describing an overview of the process by which a user rectifies problems encountered during use a of computer system in accordance with an embodiment of the present invention. Through the written description below, FIG. 2 will serve as a general guide of all of the processes and functions perform by the recovery system of the present invention.

Step 100 is generally indicative of the process by which the user creates a recovery disk. The recovery software determines which machine-specific files are necessary in order to boot from the high capacity removable disk into the full operating system environment. In other words, on a computer running Windows 9X or Windows NT, the recovery disk will contain a set of files, drivers and configuration settings to fully boot the operating system and provide the user with the operating system graphical user interface. Also, a registry file (*.reg) is generated and contained on the recovery disk which will alter certain entries in main registry. The main registry is altered to correct the path to certain virtual device drivers (VxD) in order to load the operating system from the high capacity removable media drive.

Figure 4A:
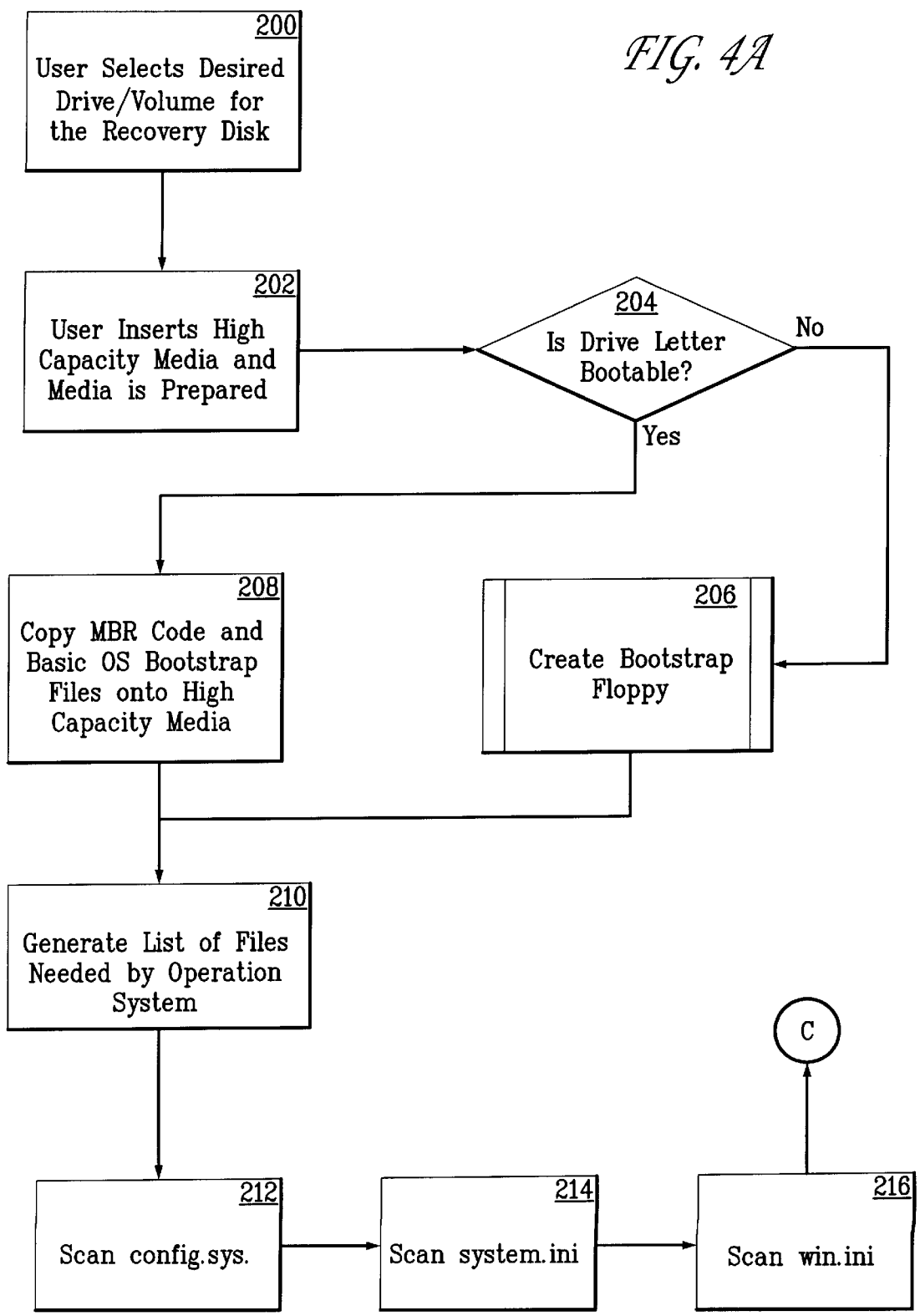
FIGS. 4A and 4B are flow charts illustrating the process of creating a rescue disk in accordance with the present invention.
Figure 4B:
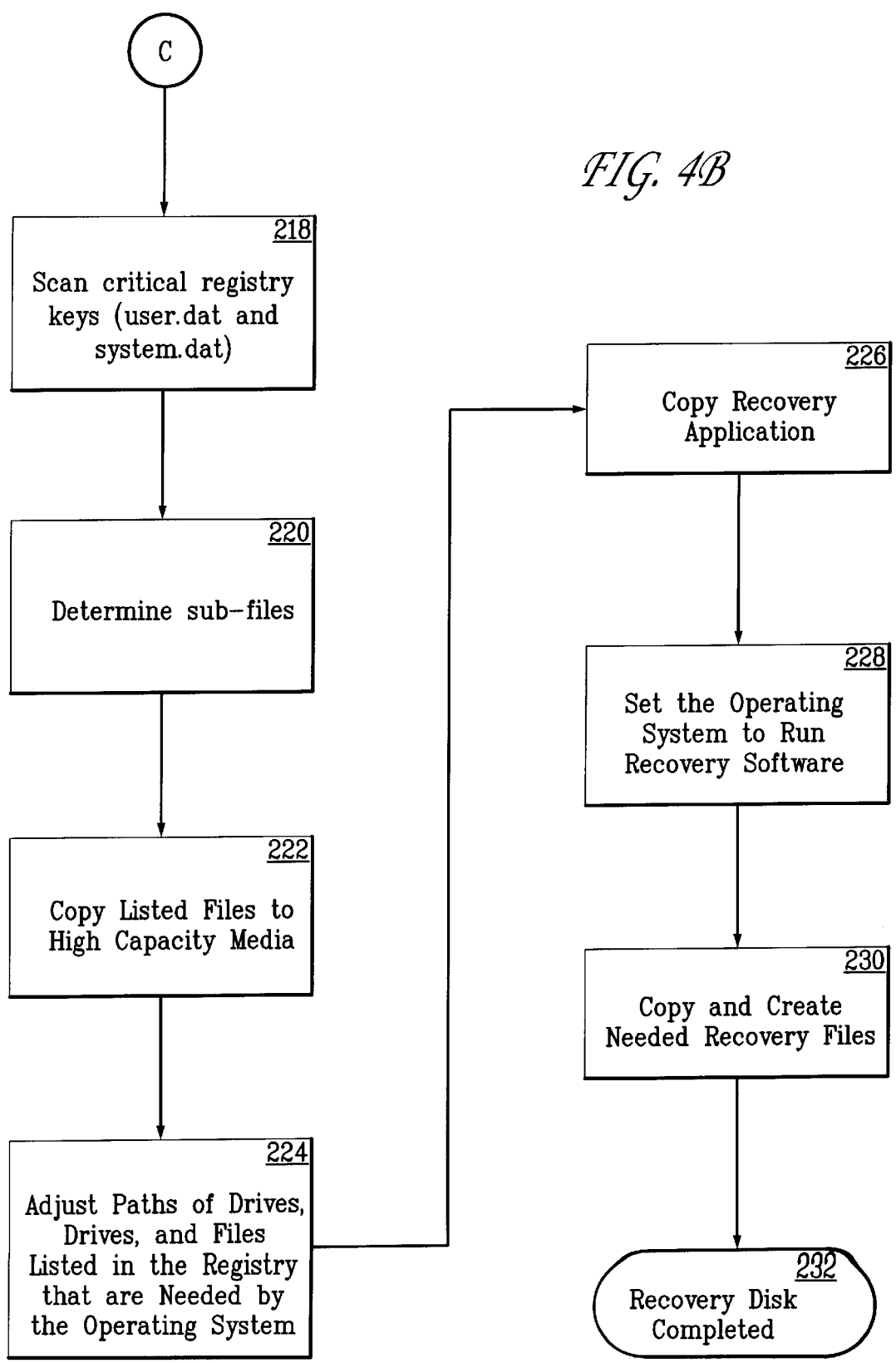

The process of creating the recovery disk at step 100 is shown in greater detail in FIGS. 4A and 4B. The user may create the recovery disk at any time or the recovery software may compel the user to create the recovery disk and to periodically update the disk in order to insure that the information stored thereon is current. The process to create a high capacity recovery disk begins at step 200 where the user selects the drive/volume to create the rescue disk media. At step 202, the user inserts the removable high capacity media, contained within a removable high capacity media cartridge, into the high capacity removable media drive 11a and the removable high capacity media is prepared. The preparation may include formatting or erasing any data on the removable high capacity media. At step 204 it is determined if the high capacity drive 11a is bootable. This determination is performed by checking the drive letter associated with the high capacity drive 11a. If the drive letter is a:, then the high capacity drive 11a is bootable, otherwise the drive 11a is not considered to be bootable. If the high capacity drive 11a is not considered to be bootable, then at step 206 a bootstrap floppy disk is created. The process of creating a bootstrap floppy disk will be described below in greater detail with reference to FIG. 5.

If the removable high capacity media drive 11a is bootable, then at step 208, the master boot record (MBR) code and basic bootstrap files are copied to the removable high capacity media. This includes copying, for example, the io.sys, msdos.sys, and command.com files to the removable high capacity media. At step 210, a list of files necessary to launch the operating system and graphical user interface (GUI) is generated. The list is generated by initially scanning a predetermined file contained on the hard disk 26. At steps 212, 214 and 216, system configuration files such as the config.sys, system.ini and win.ini files are scanned to determine if any additional drivers or other files to those listed in the predetermined file are necessary to launch the operating system and GUI. At step 218 (see FIG. 4B), critical Windows registry keys are scanned to determine if yet additional drivers or files are necessary to load the operating system. In Windows operating system, the registry is comprised of the user.dat and system.dat files. At step 220, based on the drivers and files determined at steps 212–218, additional necessary sub-files (i.e., dynamically linked library files, *.dll) for proper launching of the operating system are determined. This step is performed by examining the dependancies in the file headers of the various files and drivers previously identified.

After completing steps 212–220, and all of the files necessary to load the operating system are determined, the files are copied to the removable high capacity media at step 222. At step 224, the paths of drives, drivers and files are adjusted as necessary. In particular, entries in the registry, system.ini and win.ini typically include a hard-coded path, e.g., c:\windows\system\driver.sys. When launching the operating system from the removable high capacity media, the driver.sys file will be on, for example, drive a:. Thus, in this example, the path must be changed to reflect the location of driver.sys in order to properly load the driver.sys file from the removable media.

At step 226, the recovery applications are copied to the removable high capacity media, and at step 228, an operating system command is set to run the recovery applications when the operating system is loaded from the removable high capacity media. For example, the process of step 228 may be performed by placing the recovery applications in the "Start Up" folder. At step 230, addition recovery files are copied to the removable high capacity media, such as, CMOS settings, hard disk partition information, etc. At step 232, the creation of the recovery disk is completed and the recovery disk ready for use if an abnormal operating condition should arise.

Figure 5:
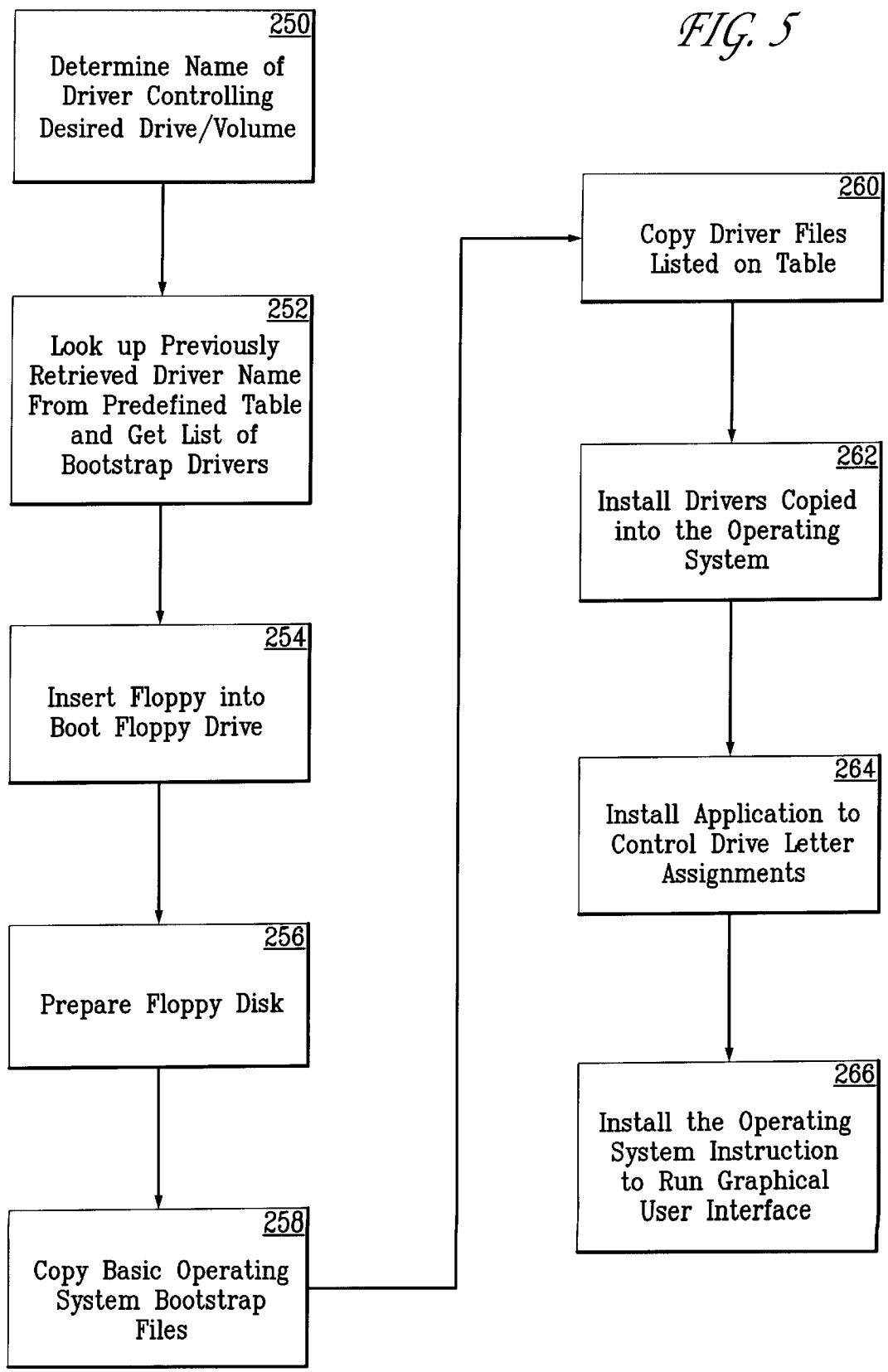
FIG. 5 is a flow chart illustrating the processes of creating a bootable floppy disk under the condition that a high capacity removable media drive of is not bootable.

If at step 204 in FIG. 4A the high capacity media drive 11a is not bootable, a bootable floppy disk is created at step 206. Referring now to FIG. 5, this process will now be described. At step 250, the driver which controls the desired drive/volume (e.g., high capacity removable media drive 11a) is determined from the operating system data structure or registry. At step 252, the driver determined at step 250 is then compared to a look-up table to determine associated bootstrap drivers, if any, that are needed for the bootstrap process. At step 254, the user inserts a floppy disk into floppy drive 28, and the floppy is prepared at step 256. The floppy may be prepared by performing a format operation or by erasing all of the files on the floppy disk. The basic operating system bootstrap files (e.g., io.sys, msdos.sys, and command.com) are copied to the floppy disk at step 258. The drivers determined at steps 250 and 252 are then copied to the floppy disk at step 260. At step 262, the drivers are installed into the operating system by adding the proper lines to, for example, the config.sys and autoexec.bat files.

At step 264, an application to control the drive letter assignments is installed to the floppy disk to ensure that the removable high capacity media drive 11a has the correct drive letter and will be seen by the system. The proper drive letter/volume is set as needed so the bootstrap process may begin from the floppy drive and continue from the high capacity removable media drive. The process of changing the drive letter/volume will be described in further detail below with reference to FIG. 6. At step 266, an operating system instruction is set to run the graphical user interface from the removable high capacity media by, e.g., adding win.com to the autoexec.bat file on the floppy disk.

Referring again to FIG. 2, the disaster/error recovery features will now be described. When a user encounters a disaster or some other error to be corrected (step 102), the user inserts the high capacity disk containing the disaster recovery software at step 104 into the drive 11a or 11b and restarts the computer to boot the operating system. If the high capacity removable media drive 11a or 11b is not bootable, then the user inserts a bootable floppy disk into the standard floppy drive 28 to boot the system. Thus, if the user restarts the computer at step 104 from a floppy disk, the computer begins the bootstrap process at step 106 by executing the bootstrap files located on the floppy disk. The drivers needed to gain access to the high capacity removable media drive 11a or 11b are loaded from the floppy disk and executed so control may be transferred to the high capacity disk which contains the necessary drivers, libraries and executable files for complete launching of the operating system and the graphical user interface.

Preferably, the user restarts the computer at step 104 directly from the high capacity removable media drive 11a or 11b, and, at step 106, the computer executes the basic bootstrap files and completely launches the operating system from the high capacity removable disk. Under both scenarios noted above, users will be provided with the same functionality at step 106, once the operating system has completely booted and the familiar graphical user interface operating environment has been launched.

Figure 3:
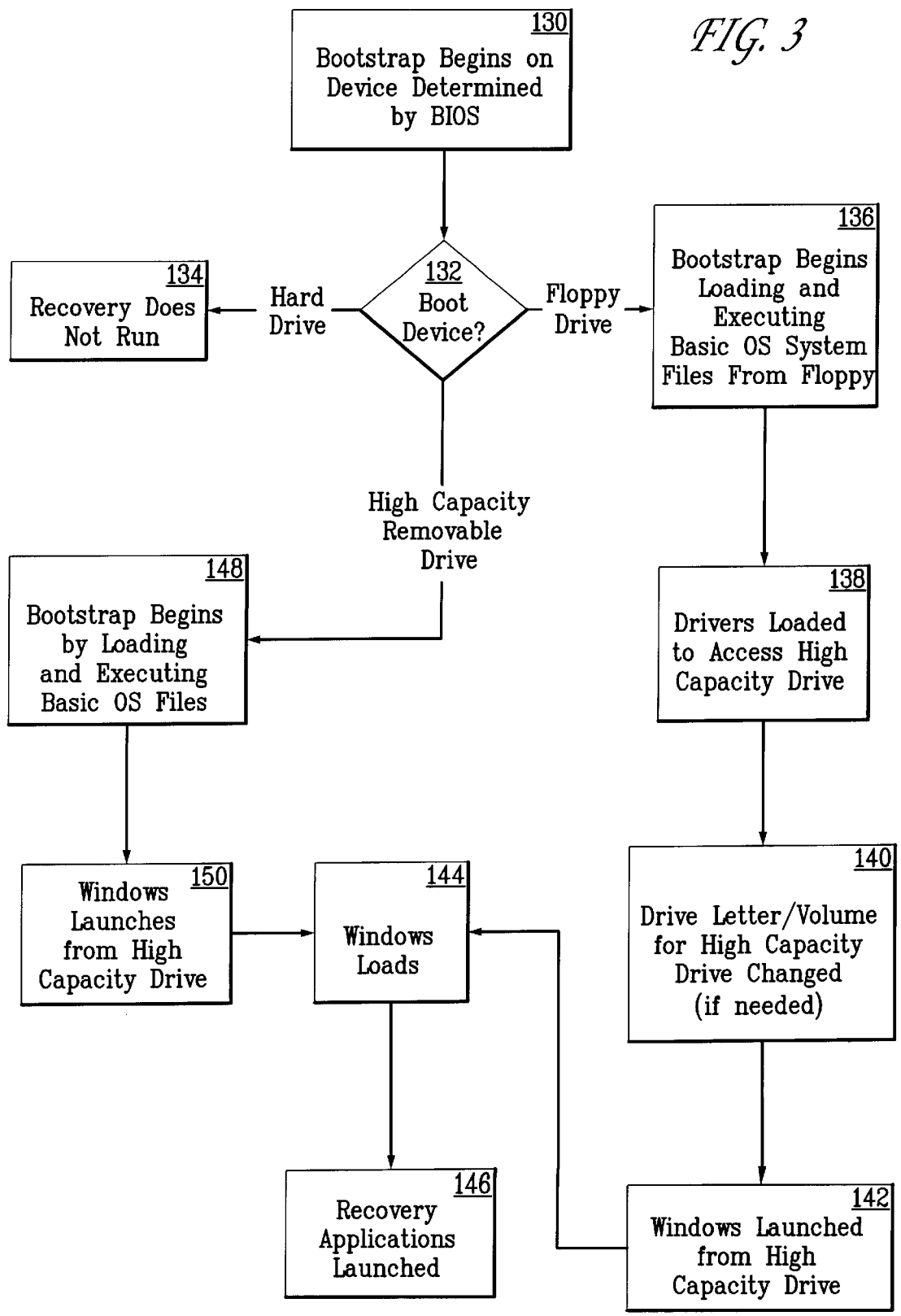
FIG. 3 is a flow chart illustrating the bootstrap process of FIG. 2 in greater detail.

The processes of steps 104 and 106 in FIG. 2 are more fully described with reference to FIG. 3, where at step 130, the computer system bootstrap process begins on the device determined by the BIOS 13 as the bootstrap device (step 132). If the bootstrap device is the hard drive (e.g., drive c:), the process is halted at step 134 as the recovery software will not operate from the hard drive. If the boot device is the high capacity removable media drive 11a, then at step 148, the bootstrap begins by loading and executing the basic operating system files from the removable high capacity media. At steps 150 and 144 the graphical user interface is launched and loaded from the removable high capacity media, and at step 146 launching of the recovery applications takes place. The recovery applications may be launched automatically or by the user.

If the boot device is the floppy drive 28, then the bootstrap process begins by loading and executing the basic operating system files from the floppy drive at step 136. At step 138, the drivers to gain access to the high capacity removable media drive 11a are loaded via, e.g., the config.sys or autoexec.bat files. At step 140, the drive letter/volume for the high capacity removable media drive 11a is changed (to be discussed below with reference to FIG. 6). The floppy disk includes a command to launch the graphical user interface from the removable high capacity media, which is executed at step 142, such that windows loads at step 144 and the recovery applications are launched at step 146.

Referring back to FIG. 2, once the GUI is launched the user is prompted to proceed with the recovery process at step 108. Alternatively, the recovery process may proceed automatically after the computer is booted. The user is prompted to run simple, easy-to-use restore and rescue applications within the operating environment of the graphical user interface. The recovery applications may detect and repair, for example, invalid CMOS settings, missing or corrupted system files, partition problems, boot sector problems, file allocation errors, and directory structure errors. The recovery applications may also detect and repair Windows registry corruption or errors. An exemplary suite of recovery applications is commercially available as the Norton Utilities, available from Symantec Corp., Cupertino, Calif.

After the recovery applications have executed at step 108, the recovery applications determined at step 110 whether the error has been corrected. If it is determined that the error cannot be corrected at step 110, then at step 118, the recovery software may prompt the user to ascertain if a backup of the computer's hard disk exists. If a backup exists, then at step 122, the user is prompted to restore the backed up files via, e.g., tape drive 15, to the hard disk using known software applications such as, Cheyenne Backup, available from Cheyenne, A Division of Computer Associates, Roslyn Heights, N.Y. If a backup of the hard drive does not exist, then the user may then be prompted to either contact a service organization (e.g., the computer vendor) or to reinstall the operating system software from, e.g., a CD-ROM using CD-ROM drive 17.

If at step 110 it is determined that the error has been corrected, then at step 112, the user is prompted to restart the computer in the normal manner (i.e., boot from the hard drive). If the problem does not persist, then the user continues as usual (step 114). However, if at step 116 the problem continues to exist even though the restore and rescue software considers the problem to be corrected, the user continues the process at steps 118–122, as noted above.

During the recovery process, certain operating environment conditions need to be considered by the recovery software. As noted above, a drive letter/volume of the high capacity removable media drive may need to be changed during the bootstrap process. In addition, because the removable high capacity media may contain partitioned media, it may be necessary to present the removable high capacity media to the operating system as non-partitioned media. Each of these processes will now be described.

Figure 6:
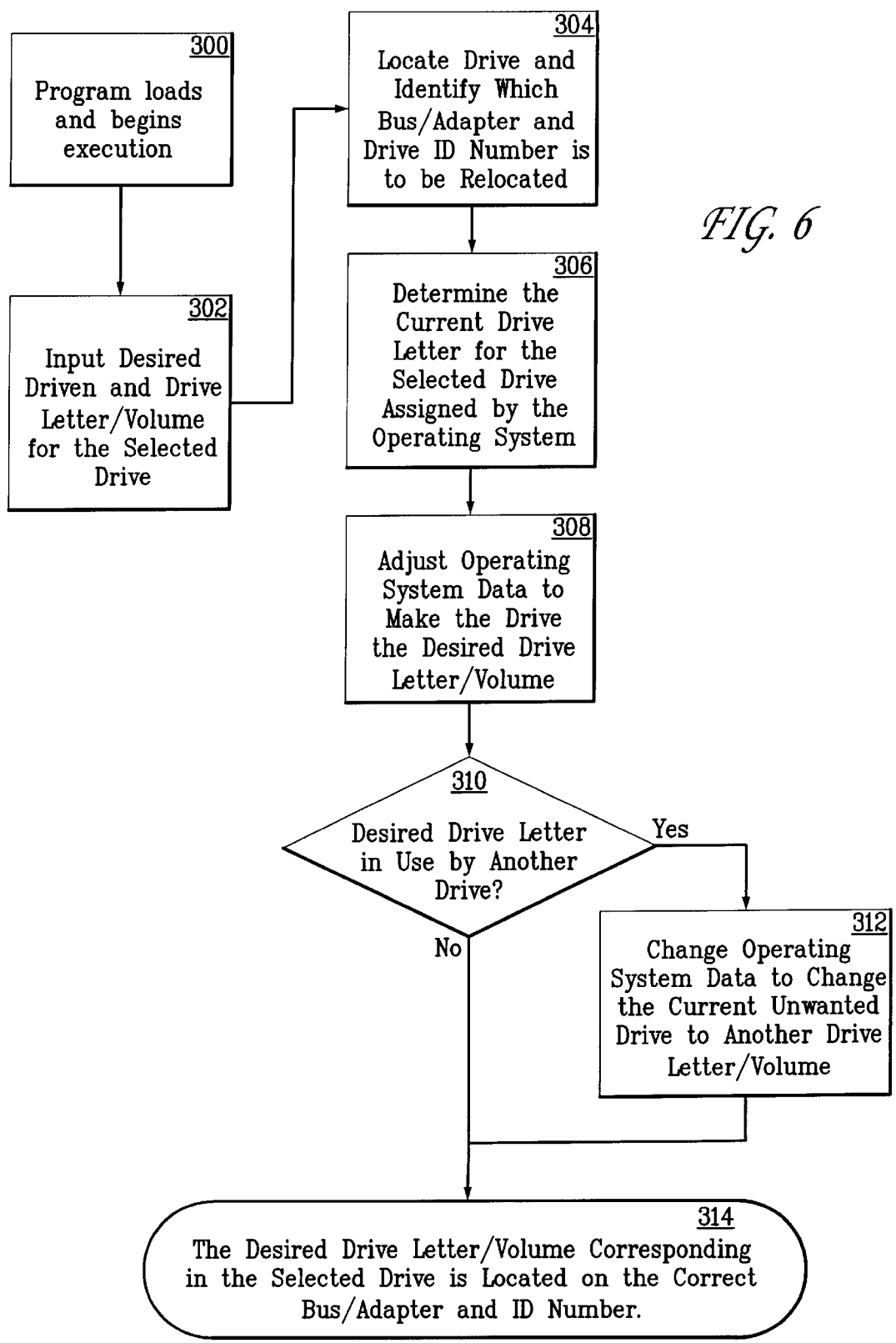
FIG. 6 is a flow chart illustrating the processes performed to change the drive letter assigned to a selected drive by the operation system.

Referring to FIG. 6, there is illustrated is a flow chart of the processes performed to change the drive letter/volume of a selected drive to another drive letter in accordance with an aspect of the present invention. At step 300 the drive letter program is loaded and executes. The drive letter/volume program may be called by another program or by the computer user. At step 302, the desired drive letter/volume for the selected drive is input to drive letter program. Similarly to calling the program, the desired drive letter/volume for the selected drive may be input to the drive letter program by calling program or the computer user. At step 304, the selected drive is located and the associated bus/adapter and drive ID number to be changed are also identified. At step 306, the current drive letter assigned to the selected drive by the operating system is determined. The location process and assigned drive letter may be determined by examining the BIOS settings and operating system configuration files. At step 308, the operating system data, settings, registry, and initialization files are adjusted to reflect the desired drive letter change by changing the assigned drive letter.

If, however, at step 310 it is determined that the desired drive letter/volume is being used by another drive, then at step 312, the other drive is assigned to a different driver letter/volume by adjusting its related operating system data, settings, registry, and initialization files so that the selected drive will have the desired drive letter/volume. At step 314 the desired drive letter/volume corresponding to the selected drive is associated with the correct bus/adapter and drive ID number.

As noted above, it may be necessary to change the drive letter of the high capacity removable media drive 11a if the bootstrap process begins from the floppy drive 28. As those of skill in the art may appreciate, other uses for the drive change process may be possible.

If the BIOS 13 of the user's system does not provide for assigning the high capacity removable media drive as drive a:, it may be necessary to present the high capacity disk as non-partitioned media to the operating system. This may be necessary if the high capacity removable disk contains partitioned media. The reason for this presentation is that standard floppy disks, generally assigned to drives a: and b:, are formatted as non-partitioned media. Accordingly, floppy disks are access by the BIOS 13 based on the non-partitioned media format. Thus, if a partitioned high capacity removable media drive is to be assigned drive letter a: or b: in a system where the BIOS is not designed for such partitioned media, the partitioned media must be hidden from the operating system to ensure proper interaction.

Computer systems 10 having a BIOS 13 that do not support high capacity removable media drives as drive a: may support such drives by utilizing the method of U.S. patent application Ser. No. 08/599,346, filed on Feb. 9, 1996, the disclosure of which is incorporated herein by reference in its entirety. It is noted that application Ser. No. 08/599,346 discloses a method to configure a high capacity removable media drive 11a as drive a: during the boot process with out the need for installing a separate driver during the boot sequence. It will be appreciated by those of ordinary skill in the art that other methods are possible to configure the high capacity removable media drive 11a as drive a:, such as loading a driver during the boot sequence, or invoking an executable file after the computer has booted to configure the high capacity removable media drive 11a as drive a: Such methods are available because operating systems such as MS-DOS, Windows 9X and Windows NT do not have any inherent capacity limitations on the size of the floppy drives, therefore a high capacity removable media drive 11a may be initially configured and recognized by the BIOS as a fixed disk drive c:, and then set to floppy drive a:.

According to the method disclosed in application Ser. No. 08/599,346, the BIOS attempts to load the operating system from a storage device by invoking INT 19h. During the boot sequence, the INT 19h routine looks for a bootable disk beginning at INT 13 unit 0, (i.e., the traditional system floppy drive a:). If a bootable floppy disk is found in the floppy drive, booting proceeds normally from the floppy. On the other hand, if no bootable floppy is contained within the floppy disk drive, INT 19h attempts to read the master boot record from the device specified at INT 13 unit 80h, which is, conventionally, fixed disk c:. However, as noted above, it is possible to configure the removable media drive at this location. Thus, booting proceeds from the removable media drive.

When the BIOS (via INT 19) attempts to retrieve the master boot record (MBR) from the media, a substitute master boot record is provided instead. For instance, in response to a request for sector 0, the removable media drive provides a substitute master boot record (referred to herein as a custom master boot record (CMBR)) from memory. The custom master boot record may be stored in a ROM on the removable media drive. Additionally, the CMBR conforms to all superficial requirements of an MBR, such as formatting requirements, size and the like, so that the BIOS, believing the CMBR is authentic, passes control to it.

The BIOS thus executes the CMBR which, in turn, requests a supplemental boot code (SBC) from sectors 1–31 on the media, referred to herein as SBC-A (to indicate that it loaded from the media). Conventionally, these sectors are unused by the PC system. By storing the SBC at this location, the removable media boot code can be modified and upgraded easily. The SBC-A code is comprised of two main segments. The first segment remains resident in the random access memory 14 of the computer system 10 after the boot process completes, providing removability support for the removable media drive in the absence of a driver. The second segment, which is no longer useful after the boot process completes, releases its memory locations to the system 10 after booting completes.

Briefly, the SBC-A first moves the resident segment of itself to the top of memory. A sector map is created to determine the location of a Boot Image File (BIF). Currently, the BIF is a 720K floppy image as defined in the Microsoft RIPL specification for diskless workstations; however, those skilled in the art should appreciate that any format could be used to accomplish a similar purpose because the SBC-A maps it. The SBC-A then hooks interrupts 13*h* (INT 13) and 2*fh* (INT 2*f*). After the interrupt hooks are set, the fixed disk count is decremented in the BIOS data area (i.e., 40:0075h) in order to temporarily hide the removable media drive from the system. In general when awakened, the INT 13 routine retrieves sector 0 from the BIF and loads it into memory at location 0:7C00h. The boot process continues from the BIF. The BIF begins to load the operating system according to a conventional loading sequence, for example IO.SYS is loaded. While that operating system load sequence continues, the INT 13 routine monitors the loading of IO.SYS searching for a predetermined pattern. When the pattern is found, a patch is inserted that handles the media change capabilities of the removable media drive. This patch remains in IO.SYS until the system is shut down and process all media change request to the removable media drive.

Each time a call is made to INT 13, the SBC interrupt routine is awakened to handle the call and make appropriate adjustments to account for the removable media drive and the non-standard boot sequence. To that end, the interrupt handler first determines the destination drive of the request. Based on the drive the interrupt routine will handle the request differently. Additionally, each time the interrupt handler is called to read from a drive, the IO.SYS load status will be checked and IO.SYS patched accordingly.

After the computer system 10 has completed booting, a segment of the SBC routine remains resident in memory to provide support for the removable media drive. This segment of the SBC gets called each time a call is made to the patched IO.SYS. On the first call to this segment of SBC, drive letter swapping (see, FIG. 6) is performed. Thereafter, this SBC segment checks the removable media drive for a media change and makes adjustments so that the operating system recognizes the new media.

Also as noted above, a removable media driver may be utilized that is loaded and located in an area of RAM in the top of conventional memory to encapsulate the DOS driver in IO.SYS associated by DOS with the removable media driver. Additionally, calls to INT 13 and INT 15 will be trapped and handled by the removable media driver to hide the partitioned media from the operating system if such a capability is not provided by the BIOS 13.

Figure 7:
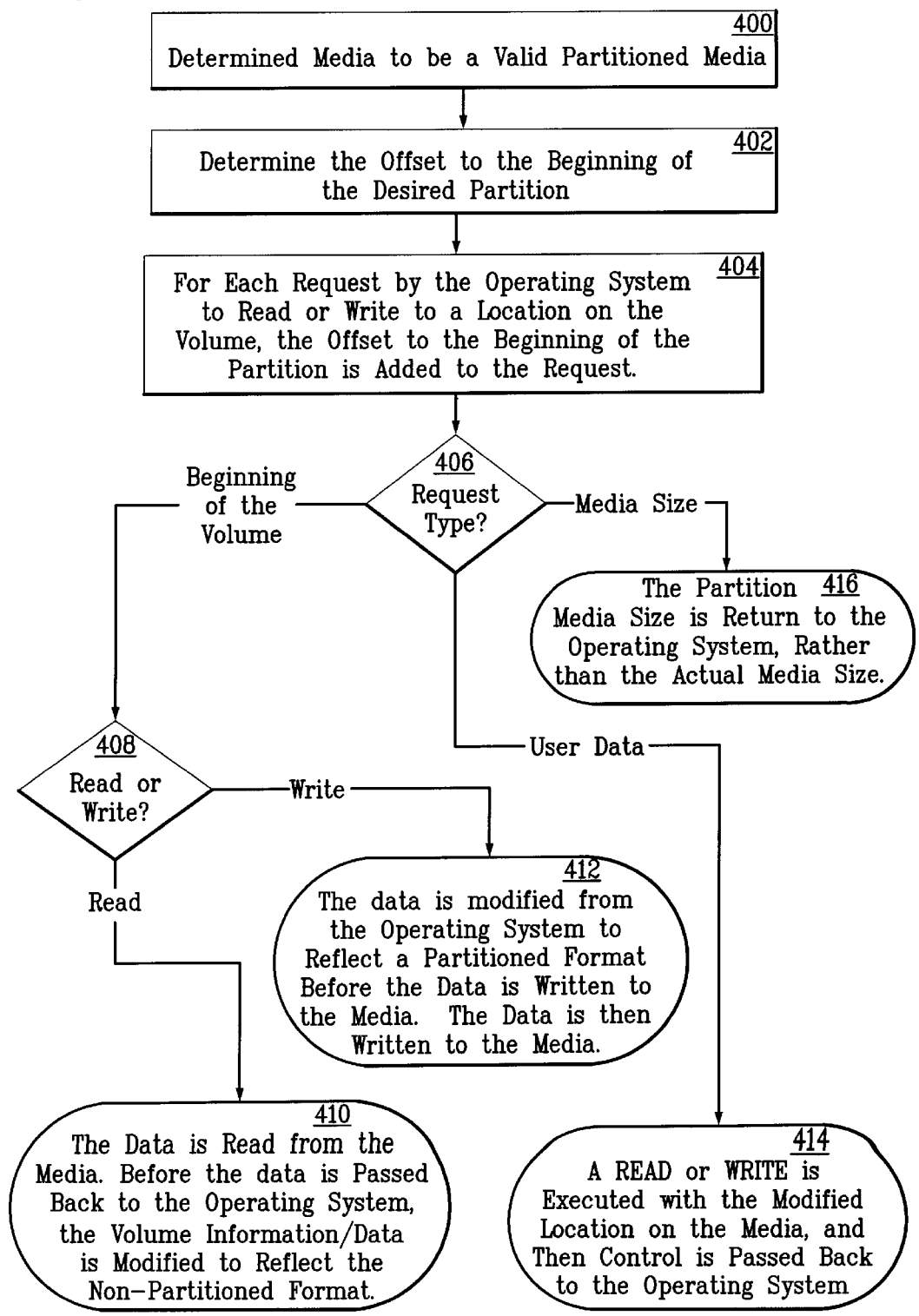
FIG. 7 is a flow chart illustrating the processes performed to present partitioned media to operating system as non-partitioned media.

Referring now to FIG. 7, there is illustrated a flow chart of processes performed by the routine to present the partitioned media to the operating system in a non-partitioned format in accordance with an aspect of the present invention.

At step 400, it is determined whether the media is a valid partitioned high capacity media. This is determination is performed by checking information contained in the media's master boot record. The master boot record contains information about the media and is contained within a separate partition than the user data. At step 402, the offset to the beginning of the desired partition (i.e., the user data partition) is determined. For each request by the operating system to read or write to a location on the volume, the offset to the beginning of the partition is added to the request by the operating system at step 404. If, at step 406, the request is for the beginning of the volume (i.e., where the volume definitions for operating system control are located), then at step 408 it is determined if the request is for a read operation (i.e., a read of the volume definitions). If so, then at step 410, the read is permitted to continue and the data is read from the media. Before the data is passed back to the operating system the volume information and data are modified to reflect the non-partitioned format. If at step 408 the request is for a write operation (i.e., a write of the volume definitions), then the data from the operating system is modified to reflect a partitioned format before the data is written to the media. The data is then permitted to be written to the media.

If at step 406 the request if is for user data, then any read or write operation is executed with the modified location on the media, and then control is passed back to the operating system. The modified location is based on the offset to the beginning of the partition. If the request at step 406 is for a media size, the partition media size is return to the operating system instead of the actual media size.

Referring now to FIG. 8, there is shown a flow chart describing a general overview of the process by which a user utilizes the recovery system of the present invention in accordance with another embodiment of the present invention in order to rectify problems encountered during use a of computer system. Steps 100' through 116' are substantially the same as the steps 100 through 116 in the embodiment shown in FIG. 2 and, accordingly, the descriptions thereof will not be repeated herein. However, the present embodiment is particularly directed to an environment where the computer system 10 is part of a larger corporate infrastucture. As such, corporate system administrators typically resolve errors and problems and the user does not have a backup or installation disks to restore the computer. Thus, when the error encountered by the user continues to persist (e.g., at steps 110' or 114'), the user is prompted at step 152 to contact the system administrator for assistance to resolve the problem.

Thus, the present invention provides a novel apparatus and method for determining all of the necessary components to completely load an operating system and it associated graphical user interface from a removable high capacity media so that users are provided with the familiar operating environment to which they are accustomed without the need to boot from the hard disk. In addition, the present invention provides for launching recovery software from the removable high capacity media, in the operating environment of the familiar graphical user interface, to correct errors so that in the event of a failure of the computer to boot from the hard drive, users may easily and confidently rectify the errors.

It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. In a computer system comprising a processor, a high capacity removable media drive, non-removable storage media and an operating system which includes an operating environment that provides a user with a graphical user interface, said operating system and said graphical user interface being loaded from said non-removable storage media under normal operating conditions, a method of creating a recovery disk comprising recovery software on removable high capacity media, comprising:

generating a list of software components needed to completely load said operating system and said graphical user interface from said removable high capacity media;

copying said software components to said removable high capacity media;

copying said recovery software to said removable high capacity media; and adjusting configuration, initialization and registry files on said removable high capacity media to reflect a drive letter or volume label of said high capacity removable media drive from which said operating system will be running when said computer is restarted from said removable high capacity media.

2. The method according to claim 1, wherein said generating a list of components comprises:

scanning a list of files on said non-removable media;

examining configuration, initialization and registry files; and searching said non-removable media to determine executable program files, libraries and program file dependencies.

3. The method according to claim 1, further comprising:

determining from said computer system if said high capacity removable media drive is bootable; and copying operating system bootstrap files to said removable high capacity media if said high capacity removable media drive is bootable.

4. The method according to claim 3, said computer system further comprising a floppy drive, said method further comprising:

creating a bootable floppy disk by copying operating system bootstrap files to said bootable floppy disk if said high capacity removable media drive is not bootable;

determining a bus type and adapter of said high capacity removable media drive;

determining software drivers needed to access said high capacity removable media drive;

copying said software drivers to said bootable floppy disk; and installing instructions to continue a bootstrap process from said high capacity removable media drive once said bootstrap process is initiated from said floppy disk.

5. The method according to claim 1, further comprising installing an operating system command run from said removable high capacity media to execute said recovery software.

6. An apparatus for creating a recovery disk for a computer system having an operating system which provides an operating environment including a graphical user interface, said recovery disk including recovery software on a removable high capacity media, comprising:

a processor;

a high capacity removable media drive;

means for generating a list of components needed to completely load said operating system and said graphical user interface from said removable high capacity media;

means for copying said components and said recovery software to said removable high capacity media; and means for adjusting configuration, initialization and registry files on said removable high capacity media to reflect a drive letter or volume label of said high capacity removable media drive from which said operating system will be running when said computer is restarted.

7. The apparatus according to claim 6, wherein said means for generating a list of components comprises:

means for scanning a list of files on said non-removable media;

means for examining configuration, initialization and registry files; and means for searching said non-removable media to determine executable program files, libraries and program file dependencies.

8. The apparatus according to claim 6, further comprising means for determining if said high capacity removable media drive is bootable, wherein if said high capacity removable media drive is bootable, said copying means copies operating system bootstrap files to said removable high capacity media.

9. The apparatus according to claim 8, said apparatus further comprising a floppy drive, means for determining a bus type and adapter of said high capacity removable media drive; and means for determining software drivers needed to access said high capacity removable media drive, wherein said copying means copies operating system bootstrap files, said operating system components, and instructions to continue a bootstrap process from said high capacity removable media drive if said high capacity removable media drive is not bootable, said instructions to continue said bootstrap process being executed once said bootstrap process is initiated from a bootable floppy disk inserted into said floppy drive.

10. The apparatus according to claim 6, said copying means further installing a command on said removable high capacity media to execute said recovery software.

11. An apparatus for bootstrapping a computer system from removable high capacity media, said computer system running an operating system that includes an operating environment which provides a user with a graphical user interface, comprising:

a processor;

a high capacity removable media drive operatively connected to said processor; and means for loading said operating system and said graphical user interface from said removable high capacity media, wherein said removable high capacity media includes all necessary operating system components, configuration, initialization and registry files and drive letter assignments to completely load said operating system and said graphical user interface and provide a user with access to all computer peripherals.

12. A removable storage cartridge comprising high capacity storage media for use in a computer system comprising a processor, non-removable media, a high capacity removable media drive and an operating system which includes an operating environment that provides a user with a graphical user interface, said high capacity storage media being configured by a method comprising:

generating a list of software components needed to completely load said operating system and said graphical user interface from said high capacity storage media; and copying said software components to said high capacity storage media adjusting configuration, initialization and registry files on said removable high capacity media to reflect a drive letter or volume label of said high capacity removable media drive from which said operating system will be running when said computer is restarted from said removable high capacity media.

13. The removable storage cartridge according to claim 12, wherein said generating a list of components comprises:

scanning a list of files on said non-removable media;

examining configuration, initialization and registry files; and searching said non-removable media to determine executable program files, libraries and program file dependencies.

14. The removable storage cartridge according to claim 12, further comprising:

determining from said computer system if said high capacity removable media drive is bootable; and copying operating system bootstrap files to said high capacity storage media if said high capacity removable media drive is bootable.

15. The removable storage cartridge according to claim 14, said computer system further comprising a floppy drive, said removable storage cartridge further comprising:

creating a bootable floppy disk by copying operating system bootstrap files to said bootable floppy disk if said high capacity removable media drive is not bootable;

determining a bus type and adapter of said high capacity removable media drive;

determining software drivers needed to access said high capacity removable media drive;

copying said software drivers to said bootable floppy disk; and installing instructions to continue a bootstrap process from said high capacity removable media drive once said bootstrap process is initiated from said floppy disk.

16. The removable storage cartridge according to claim 12, further comprising:

copying recovery software to said high capacity storage media; and installing an operating system command run from said high capacity storage media to execute said recovery software.

17. Application software for use on a computer system having a high capacity removable media drive and an operating system which provides an operating environment including a graphical user interface, said application software comprising:

system components needed to completely load said operating system and said graphical user interface from said high capacity removable media drive; and recovery components which are run from said graphical user interface, wherein said application software is provided on removable high capacity media which is read by said high capacity removable media drive wherein said removable high capacity media includes all necessary operating system component, configuration, initialization and registry files and drive letter assignments to completely load said operating system and said graphical user interface and provide a user with access to all computer peripherals.

18. The application software according to claim 17, further comprising operating system bootstrap files.

19. The application software according to claim 18, wherein said operating system bootstrap files are provided on a floppy disk and said application software further comprises an instruction to continue a bootstrap process from said high capacity removable media drive if said high capacity removable media drive is not bootable, said instruction to continue said bootstrap process being executed once said bootstrap process is initiated from said floppy disk.

20. The application software according to claim 17, further comprising a command, installed on said removable high capacity media, to execute said recovery components.

21. An apparatus for creating a recovery disk for a computer system having an operating system which provides an operating environment including a graphical user interface, said recovery disk including recovery software on a removable high capacity media, comprising:

a processor;

a high capacity removable media drive;

a file list generating application which generates a list of components needed to completely load said operating system and said graphical user interface from said removable high capacity media; and an adjustment application which adjusts configuration, initialization and registry files on said removable high capacity media to reflect a drive letter or volume label of said high capacity removable media drive from which said operating system will be running when said computer is restarted, wherein said apparatus copies said components and said recovery software to said removable high capacity media.

22. The apparatus according to claim 21, wherein said file list generating application scans a list of files on said non-removable media; examines configuration, initialization and registry files; and searches said non-removable media to determine executable program files, libraries and program file dependencies.

23. The apparatus according to claim 21, further comprising an application to determine if said high capacity removable media drive is bootable, and if said high capacity removable media drive is bootable, said removable high capacity media comprises operating system bootstrap files.

24. The apparatus according to claim 23, said apparatus further comprising:
- a floppy drive, and
- an drive identification application which determines a bus type and adapter of said high capacity removable media drive,
- wherein said apparatus copies operating system bootstrap files, said operating system components, and a device driver to access said high capacity removable driver, and
- wherein said apparatus copes instructions to continue a bootstrap process from said high capacity removable media drive if said high capacity removable media drive is not bootable, said instructions to continue said bootstrap process being executed once said bootstrap process is initiated from a bootable floppy disk inserted into said floppy drive.

25. The apparatus according to claim 21, said apparatus further installing a command on said removable high capacity media to execute said recovery software.

26. An apparatus for bootstrapping a computer system from removable high capacity media, said computer system running an operating system that includes an operating environment which provides a user with a graphical user interface, comprising:
- a processor;
- a high capacity removable media drive operatively connected to said processor; and
- an input/output system which loads said operating system and said graphical user interface from said removable high capacity media,
- wherein said removable high capacity media includes all necessary operating system components, configuration, initialization and registry files and drive letter assignments to completely load said operating system and said graphical user interface and provide a user with access to all computer peripherals.

* * * * *